United States Patent
Akada et al.

(10) Patent No.: US 11,186,902 B2
(45) Date of Patent: Nov. 30, 2021

(54) WIRE MATERIAL FOR CANTED COIL SPRING AND CANTED COIL SPRING

(71) Applicant: Sumitomo Electric Industries, Ltd., Osaka (JP)

(72) Inventors: Takumi Akada, Itami (JP); Hiromu Izumida, Itami (JP); Akihisa Hosoe, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 16/492,895

(22) PCT Filed: Dec. 4, 2017

(86) PCT No.: PCT/JP2017/043445
§ 371 (c)(1),
(2) Date: Sep. 10, 2019

(87) PCT Pub. No.: WO2018/163541
PCT Pub. Date: Sep. 13, 2018

(65) Prior Publication Data
US 2020/0056671 A1    Feb. 20, 2020

(30) Foreign Application Priority Data
Mar. 10, 2017    (JP) .............................. JP2017-045720

(51) Int. Cl.
*F16F 1/04*    (2006.01)
*B32B 15/01*    (2006.01)
(Continued)

(52) U.S. Cl.
CPC ............... *C22C 38/40* (2013.01); *B32B 1/00* (2013.01); *B32B 15/013* (2013.01);
(Continued)

(58) Field of Classification Search
CPC ........ C22C 38/00; C22C 38/46; C22C 38/002; C22C 38/02; C22C 38/04; C22C 38/24;
(Continued)

(56) References Cited

U.S. PATENT DOCUMENTS 6,372,056 B1 * 4/2002 Kuroda .................... C21D 8/06
148/320
2007/0232154 A1 * 10/2007 Zhao ..................... H01M 2/206
439/759

(Continued)

FOREIGN PATENT DOCUMENTS

CN    1272890 A    11/2000
EP    1 018 565 A1    7/2000
(Continued)

OTHER PUBLICATIONS

Hardness Table, www.praterindustries.com, (no date), downloaded Aug. 2, 2020 (three pages) (Year: 2020).*
(Continued)

*Primary Examiner* — Michael E. La Villa
(74) *Attorney, Agent, or Firm* — Baker Botts L.L.P.; Michael A. Sartori (57) ABSTRACT

A wire material for a canted coil spring includes a core wire composed of a steel having a pearlite structure, a copper plating layer covering the outer peripheral surface of the core wire, the copper plating layer being composed of copper or a copper alloy, and a hard layer disposed adjacent to the outer periphery of the copper plating layer, the hard layer having a higher hardness than the copper plating layer. The steel constituting the core wire contains 0.5% or more by mass and 1.0% or less by mass carbon, 0.1% or more by mass and 2.5% or less by mass silicon, and 0.3% or more by mass and 0.9% or less by mass manganese, the balance being iron and unavoidable impurities.

10 Claims, 5 Drawing Sheets

(51) Int. Cl.

| | |
|---|---|
| *C22C 38/24* | (2006.01) |
| *C22C 38/04* | (2006.01) |
| *C22C 38/02* | (2006.01) |
| *C22C 38/00* | (2006.01) |
| *C25D 5/12* | (2006.01) |
| *C25D 7/06* | (2006.01) |
| *C22C 38/40* | (2006.01) |
| *H01R 13/03* | (2006.01) |
| *C22C 38/46* | (2006.01) |
| *F16F 1/06* | (2006.01) |
| *C22C 38/44* | (2006.01) |
| *C23C 30/00* | (2006.01) |
| *C22C 38/08* | (2006.01) |
| *C22C 38/22* | (2006.01) |
| *C23C 2/38* | (2006.01) |
| *C23C 28/02* | (2006.01) |
| *B32B 1/00* | (2006.01) |
| *C22C 38/12* | (2006.01) |
| *C22C 38/18* | (2006.01) |
| *B32B 15/04* | (2006.01) |
| *C23C 2/04* | (2006.01) |
| *F16F 1/02* | (2006.01) |
| *B32B 15/18* | (2006.01) |

(52) U.S. Cl.
CPC ............ *B32B 15/015* (2013.01); *B32B 15/04* (2013.01); *B32B 15/043* (2013.01); *B32B 15/18* (2013.01); *C22C 38/00* (2013.01); *C22C 38/002* (2013.01); *C22C 38/02* (2013.01); *C22C 38/04* (2013.01); *C22C 38/08* (2013.01); *C22C 38/12* (2013.01); *C22C 38/18* (2013.01); *C22C 38/22* (2013.01); *C22C 38/24* (2013.01); *C22C 38/44* (2013.01); *C22C 38/46* (2013.01); *C23C 2/04* (2013.01); *C23C 2/38* (2013.01); *C23C 28/02* (2013.01); *C23C 28/021* (2013.01); *C23C 28/023* (2013.01); *C23C 28/028* (2013.01); *C23C 30/00* (2013.01); *C23C 30/005* (2013.01); *C25D 5/12* (2013.01); *C25D 7/06* (2013.01); *C25D 7/0607* (2013.01); *F16F 1/021* (2013.01); *F16F 1/04* (2013.01); *F16F 1/042* (2013.01); *F16F 1/045* (2013.01); *F16F 1/06* (2013.01); *H01R 13/03* (2013.01); *B32B 2307/536* (2013.01); *F16F 2224/0216* (2013.01); *Y10T 428/1291* (2015.01); *Y10T 428/12715* (2015.01); *Y10T 428/12722* (2015.01); *Y10T 428/12854* (2015.01); *Y10T 428/12882* (2015.01); *Y10T 428/12889* (2015.01); *Y10T 428/12896* (2015.01); *Y10T 428/12903* (2015.01); *Y10T 428/12917* (2015.01); *Y10T 428/12924* (2015.01); *Y10T 428/12931* (2015.01); *Y10T 428/12937* (2015.01); *Y10T 428/12944* (2015.01); *Y10T 428/12951* (2015.01); *Y10T 428/12972* (2015.01); *Y10T 428/2495* (2015.01); *Y10T 428/24942* (2015.01); *Y10T 428/24983* (2015.01); *Y10T 428/26* (2015.01)

(58) Field of Classification Search
CPC ......... C22C 38/08; C22C 38/12; C22C 38/18; C22C 38/22; C22C 38/40; C22C 38/44; F16F 1/045; F16F 1/06; F16F 1/042; F16F 1/021; F16F 2224/0216; F16F 1/04; H01R 13/03; B32B 1/00; B32B 15/015; B32B 15/013; B32B 15/04; B32B 15/043; B32B 15/18; B32B 2307/536; C25D 5/12; C25D 7/06; C25D 7/0607; C23C 2/04; C23C 2/38; C23C 30/00; C23C 30/005; C23C 28/02; C23C 28/021; C23C 28/023; C23C 28/028; Y10T 428/12882; Y10T 428/12889; Y10T 428/12896; Y10T 428/12722; Y10T 428/12715; Y10T 428/12903; Y10T 428/1291; Y10T 428/12917; Y10T 428/12924; Y10T 428/12931; Y10T 428/12937; Y10T 428/12944; Y10T 428/12854; Y10T 428/12972; Y10T 428/12951; Y10T 428/24942; Y10T 428/2495; Y10T 428/24983; Y10T 428/26

See application file for complete search history.

(56) References Cited

U.S. PATENT DOCUMENTS

| | | | |
|---|---|---|---|
| 2019/0154096 A1 | | 5/2019 | Izumida |
| 2020/0080166 A1 | * | 3/2020 | Akada ................... C22C 38/44 |

FOREIGN PATENT DOCUMENTS

| | | | |
|---|---|---|---|
| JP | 61-151914 A | | 7/1986 |
| JP | 04-107331 A | | 4/1992 |
| JP | 04-187335 A | | 7/1992 |
| JP | 6-158353 A | | 7/1994 |
| JP | 2000-345294 A | | 12/2000 |
| JP | 2002-178077 A | | 6/2002 |
| JP | 2004-149816 | * | 5/2004 |
| JP | 2012-248495 A | | 12/2012 |
| JP | 2015-030071 | * | 2/2015 |
| WO | WO 2012/085651 | * | 6/2012 |
| WO | 2017/212770 A1 | | 12/2017 |

OTHER PUBLICATIONS

Comparison of Material Between Hardness (MOHS) and Vickers Hardness or Rockwell "C" Scales, www.roslerblog.com, (Feb. 2016), downloaded on Aug. 2, 2020 (three pages). (Year: 2016).*
Machine Translation, Kodama et al., JP 2015-030071, Feb. 2015. (Year: 2015).*
SWRS72A Datasheet, downloaded www.steeljis.com, (no date), downloaded on Aug. 2, 2020 (1 page). (Year: 2020).*
Machine Translation, Ibaraki et al., JP 2004-149816, May 2004. (Year: 2004).*
Office Action issued in U.S. Appl. No. 16/308,674, dated Nov. 27, 2020.
Office Action in U.S. Appl. No. 16/308,674, dated Mar. 9, 2021.

* cited by examiner

WIRE MATERIAL FOR CANTED COIL SPRING AND CANTED COIL SPRING

TECHNICAL FIELD

The present invention relates to wire material for a canted coil spring and a canted coil spring. The present application claims priority to Japanese Patent Application No. 2017-045720 filed on Mar. 10, 2017, the entire contents of which are incorporated herein by reference.

BACKGROUND ART

Canted coil springs, which are helical springs each having a structure in which a wire material (metal wire) is wound at an angle to a plane perpendicular to the axial direction, are known (for example, see Patent Literature 1). Such a canted coil spring has a characteristic (nonlinearity) that a spring load remains substantially constant in a certain displacement range in a direction perpendicular to the axial direction. Canted coil springs produced with conductive materials can be used as, for example, contact components. As a material of such a canted coil spring used for a contact component, beryllium copper is typically used. Beryllium copper is suitable as a material constituting a canted coil spring from the viewpoint of achieving both strength and conductivity at high levels.

Beryllium contained in beryllium copper is, however, an expensive material. Additionally, beryllium is a material having a high environmental load. The development of a material, which is used as a material constituting canted coil springs, alternative to beryllium copper is desired.

To deal with this, a report is given on a wire material for a canted coil spring in which a core wire composed of an austenitic stainless steel and a separately provided member, composed of a material such as copper or a copper alloy, to be an outer layer are integrated into a clad wire, and a canted coil spring obtained by coiling the wire material (for example, see Patent Literature 2).

CITATION LIST

Patent Literature

PTL 1: Japanese Unexamined Patent Application Publication No. 4-107331
PTL 2: Japanese Unexamined Patent Application Publication No. 2012-248495

SUMMARY OF INVENTION

Solution to Problem

A canted coil spring according to the present invention includes a core wire composed of a steel having a pearlite structure, a copper plating layer covering the outer peripheral surface of the core wire, the copper plating layer being composed of copper or a copper alloy, and a hard layer disposed adjacent to the outer periphery of the copper plating layer, the hard layer having a higher hardness than the copper plating layer. The steel contains 0.5% or more by mass and 1.0% or less by mass carbon, 0.1% or more by mass and 2.5% or less by mass silicon, and 0.3% or more by mass and 0.9% or less by mass manganese, the balance being iron and unavoidable impurities.

DESCRIPTION OF EMBODIMENTS

Problems to be Solved by Present Disclosure

Studies conducted by the inventors have revealed that the canted coil spring described in Patent Literature 2 has a problem that the displacement range in which a spring load is substantially constant with respect to the displacement in a direction perpendicular to the axial direction, i.e., a nonlinear region, is narrow. Additionally, in a canted coil spring having conductivity, it is also important that the conductivity be stable.

Accordingly, it is an object of the present invention to provide a wire material for a canted coil spring, the wire material being composed of an alternative material to beryllium copper, having a wide nonlinear region, and being capable of achieving stable conductivity, and a canted coil spring.

Advantageous Effects of Present Disclosure

According to the wire material for a canted coil spring, it is possible to provide the wire material for a canted coil spring, the wire material being composed of an alternative material to beryllium copper, having a wide nonlinear region, and being capable of achieving stable conductivity.

Description of Embodiments of Present Invention

Embodiments of the present invention are first listed and explained. A wire material for a canted coil spring according to the present invention includes a core wire composed of a steel having a pearlite structure, a copper plating layer covering the outer peripheral surface of the core wire, the copper plating layer being composed of copper or a copper alloy, and a hard layer disposed adjacent to the outer periphery of the copper plating layer, the hard layer having a higher hardness than the copper plating layer. The steel contains 0.5% or more by mass and 1.0% or less by mass carbon, 0.1% or more by mass and 2.5% or less by mass silicon, and 0.3% or more by mass and 0.9% or less by mass manganese, the balance being iron and unavoidable impurities.

In the wire material for a canted coil spring according to the present invention, the high-strength core wire composed of a steel having a pearlite structure and an appropriate component composition is used, thereby enabling a wide nonlinear region to be ensured. The outer peripheral surface of the core wire is covered with the copper plating layer composed of copper or a copper alloy, which has good conductivity.

Thereby, high conductivity is ensured.

The wire material for a canted coil spring according to the present invention is not a clad wire formed by integrating a core wire with a separately provided member to be an outer layer, but has a structure in which the copper plating layer is disposed on the outer peripheral surface of the core wire. Studies by the inventors indicate that in a canted coil spring obtained from the clad wire, a phenomenon occurs in which the outer layer is displaced with respect to the core wire when a load is applied. This phenomenon is a major factor that narrows the nonlinear region. In contrast, in the wire material for a canted coil spring according to the present invention, the wire material including the copper plating layer disposed on the outer peripheral surface of the core wire, the occurrence of the phenomenon is inhibited to enable a wide nonlinear region to be ensured.

The wire material for a canted coil spring according to the present invention further includes a hard layer disposed adjacent to the outer periphery of the copper plating layer. In the usage state of the canted coil spring, a larger stress is repeatedly applied at a position closer to the outer peripheral surface. Studies by the inventors indicate that the repeated stress may cause the fatigue failure of the copper plating layer to decrease the conductivity. In contrast, the hard layer having a higher hardness than the copper plating layer is disposed adjacent to the outer periphery of the copper plating layer, i.e., on the side on which a large stress acts; thus, it is possible to inhibit a decrease in conductivity due to fatigue failure of the copper plating layer. This enables stable conductivity to be achieved.

In the wire material for a canted coil spring according to the present invention, as described above, it is possible to provide a wire material for a canted coil spring, the wire material being composed of an alternative material to beryllium copper, having a wide nonlinear region, and being capable of achieving stable conductivity.

In the wire material for a canted coil spring, the steel may further contain one or more elements selected from the group consisting of 0.1% or more by mass and 0.4% or less by mass nickel, 0.1% or more by mass and 1.8% or less by mass chromium, 0.1% or more by mass and 0.4% or less by mass molybdenum, and 0.05% or more by mass and 0.3% or less by mass vanadium. Even if a core wire composed of the steel having the component composition is used, it is possible to provide a wire material for a canted coil spring, the wire material being composed of an alternative material to beryllium copper and being capable of achieving a wide nonlinear region.

The reason the component composition of the steel constituting the core wire is limited to the ranges described above will be described below.

Carbon (C): 0.5% or More by Mass and 1.0% or Less by Mass

Carbon is an element that greatly affects the strength and the elastic limit of the steel having a pearlite structure. From the viewpoint of achieving the strength and the elastic limit sufficient as the core wire for use in the wire material for a canted coil spring, the carbon content needs to be 0.5% or more by mass. A higher carbon content results in a decrease in toughness, thereby possibly making it difficult to work the core wire. From the viewpoint of ensuring sufficient toughness, the carbon content needs to be 1.0% or less by mass. From the viewpoint of further improving the strength and the elastic limit, the carbon content is preferably 0.6% or more by mass, more preferably 0.8% or more by mass. From the viewpoint of improving the toughness to facilitate working, the carbon content is preferably 0.95% or less by mass.

Silicon (Si): 0.1% or More by Mass and 2.5% or Less by Mass

Silicon is an element added as a deoxidizing agent in the refining of steel. To fulfill its function as the deoxidizing agent, the silicon content needs to be 0.1% or more by mass, preferably 0.12% or more by mass. Additionally, silicon serves as a carbide-forming element in the steel and has a property (softening resistance) that inhibits softening due to heating. From the viewpoint of inhibiting softening in strain relieving heat treatment performed after the wire material has been coiled, the silicon content is preferably 0.8% or more by mass and may be 1.8% or more by mass. An excessive addition of silicon results in a decrease in toughness. From the viewpoint of ensuring sufficient toughness, the silicon content needs to be 2.5% or less by mass, preferably 2.3% or less by mass, and may be 2.2% or less by mass. From the viewpoint of placing importance on toughness, the silicon content may be 1.0% or less by mass.

Manganese (Mn): 0.3% or More by Mass and 0.9% or Less by Mass

As with silicon, manganese is an element added as a deoxidizing agent in the refining of steel. To fulfill its function as the deoxidizing agent, the manganese content needs to be 0.3% or more by mass.

An excessive addition of manganese results in decreases in toughness and workability in hot working. Thus, the manganese content needs to be 0.9% or less by mass.

Unavoidable Impurity

In a process of producing the core wire, phosphorus (P) and sulfur (S) are inevitably mixed in steel constituting the core wire. An excessive presence of phosphorus and sulfur results in grain boundary segregation and the formation of inclusions, thereby degrading the properties of the steel. Thus, each of the phosphorus content and the sulfur content is preferably 0.025% or less by mass. The total content of unavoidable impurities is preferably 0.3% or less by mass.

Nickel (Ni): 0.1% or More by Mass and 0.4% or Less by Mass

The addition of nickel inhibits the breakage of the core wire during wire drawing and the breakage of the wire material during coiling. From the viewpoint of reliably providing the functions, nickel may be added in an amount of 0.1% or more by mass. If nickel is added in an amount of more than 0.4% by mass, the foregoing effects of nickel are saturated. Additionally, if nickel, which is an expensive element, is added in an amount of more than 0.4% by mass, the production cost of the core wire is increased. Thus, the amount of nickel added is preferably 0.4% or less by mass.

Chromium (Cr): 0.1% or More by Mass and 1.8% or Less by Mass

Chromium serves as a carbide-forming element in steel and contributes to the formation of a finer metal microstructure due to the formation of fine carbide and the inhibition of softening during heating. From the viewpoint of reliably providing the effects, chromium may be added in an amount of 0.1% or more by mass, 0.2% or more by mass, or 0.5% or more by mass. An excessive addition of chromium causes a decrease in toughness. Thus, the amount of chromium added is preferably 1.8% or less by mass. The effects obtained by the addition of chromium are particularly significant in the presence of silicon and vanadium. Thus, chromium is preferably added together with these elements.

Molybdenum (Mo): 0.1% or More by Mass and 0.4% or Less by Mass

The addition of molybdenum enables an increase in the elastic limit. From the viewpoint of reliably providing the effect, molybdenum may be added in an amount of 0.1% or more by mass. If molybdenum is added in an amount of more than 0.4% by mass, the effect of molybdenum is saturated. Additionally, if molybdenum, which is an expensive element, is added in an amount of more than 0.4% by mass, the production cost of the core wire is increased. Thus, the amount of molybdenum added is preferably 0.4% or less by mass.

Vanadium (V): 0.05% or More by Mass and 0.3% or Less by Mass

Vanadium serves as a carbide-forming element in steel and contributes to the formation of a finer metal microstructure due to the formation of fine carbide and the inhibition of softening during heating. From the viewpoint of reliably providing the effects, vanadium may be added in an amount of 0.05% or more by mass. An excessive addition of vanadium decreases toughness. From the viewpoint of ensuring sufficient toughness, the amount of vanadium added is preferably 0.3% or less by mass. The effects provided by the addition of vanadium are particularly significant in the presence of silicon and chromium. Thus, vanadium is preferably added together with these elements.

In the wire material for a canted coil spring, the steel may have a silicon content of 1.35% or more by mass and 2.3% or less by mass. A silicon content of 1.35% or more by mass results in the inhibition of softening in strain relieving heat treatment. A silicon content of 2.3% or less by mass results in the inhibition of a decrease in toughness.

In the wire material for a canted coil spring, the steel may contain 0.6% or more by mass and 1.0% or less by mass carbon, 0.12% or more by mass and 0.32% or less by mass silicon, and 0.3% or more by mass and 0.9% or less by mass manganese, the balance being iron and unavoidable impurities.

In the wire material for a canted coil spring, the steel may contain 0.6% or more by mass and 1.0% or less by mass carbon, 0.7% or more by mass and 1.0% or less by mass silicon, and 0.3% or more by mass and 0.9% or less by mass manganese, the balance being iron and unavoidable impurities.

In the wire material for a canted coil spring, the steel may contain 0.55% or more by mass and 0.7% or less by mass carbon, 1.35% or more by mass and 2.3% or less by mass silicon, 0.3% or more by mass and 0.9% or less by mass manganese, 0.2% or more by mass and 1.8% or less by mass chromium, and 0.05% or more by mass and 0.30% or less by mass vanadium, the balance being iron and unavoidable impurities.

When the steel having such a component composition is used as a steel constituting the core wire, it is possible to more reliably obtain a wide nonlinear region.

In the wire material for a canted coil spring, the hard layer may have a hardness of 300 HV or more. In this case, it is possible to more reliably achieve stable conductivity.

In the wire material for a canted coil spring, the hard layer may have a hardness of 50 HV or more higher than the copper plating layer. In this case, it is possible to more reliably achieve stable conductivity. The hard layer may have a lower hardness than the core wire.

In the wire material for a canted coil spring, the ratio of the thickness of the hard layer to the thickness of the copper plating layer may be 1/10 or more and less than 1. That is, the value of (thickness of hard layer)/(thickness of copper plating layer) may be 1/10 or more and less than 1. When the ratio is 1/10 or more, it is possible to more reliably achieve stable conductivity. When the ratio is less than 1, it is possible to avoid a decrease in production efficiency. In the case where a plating layer is used as the hard layer, the use of a ratio of less than 1 enables the inhibition of a decrease in toughness due to the entry of hydrogen during the formation of the hard layer. The ratio is preferably 1/3 or more. The ratio is preferably 3/4 or less.

In the wire material for a canted coil spring, the hard layer may be a plating layer. In this case, the hard layer can be easily formed.

In the wire material for a canted coil spring, the hard layer may be a nickel layer or a chromium layer. As a material constituting the hard layer, nickel or chromium, which has good strength and good conductivity, can be used. The hard layer is particularly preferably a nickel layer. The use of the nickel layer as the hard layer facilitates the formation of a gold layer or silver layer as a plating layer on the hard layer.

The wire material for a canted coil spring may have a tensile strength of 900 MPa or more and 3,000 MPa or less. At a tensile strength of 900 MPa or more, sufficient settling resistance is easily obtained. At a tensile strength of 3,000 MPa or less, sufficient toughness is easily ensured. The wire material for a canted coil spring preferably has a tensile strength of 1,500 MPa or more. The wire material for a canted coil spring preferably has a tensile strength of 2,500 MPa or less.

The wire material for a canted coil spring may have a conductivity of 15% or more in terms of International Annealed Copper Standard (IACS) ($3.87 \times 10^8$/Ω·m or more) and 50% IACS or less ($1.29 \times 10^9$/Ω·m or less). In this case, it is possible to obtain the wire material for a canted coil spring, the wire material being capable of producing a canted coil spring suitable for a contact component. The wire material for a canted coil spring preferably has a conductivity of 25% IACS or more. The wire material for a canted coil spring preferably has a conductivity of 40% IACS or less.

In the wire material for a canted coil spring, an alloy region containing a metal element constituting the copper plating layer and a metal element constituting the hard layer may be disposed between the copper plating layer and the hard layer. In this case, it is possible to obtain the wire material for a canted coil spring in which the copper plating layer and the hard layer are strongly bonded together.

In the wire material for a canted coil spring, the hard layer may be a nickel layer, and the alloy region may contain copper and nickel. In this case, it is possible to obtain the wire material for a canted coil spring, the wire material including the copper plating layer and the hard layer that are strongly bonded together.

In the wire material for a canted coil spring, a gold layer, a silver layer, or a tin layer may be disposed on the hard layer so as to contain the outer peripheral surface of the wire material for a canted coil spring. In this case, it is possible to reduce the contact resistance when the canted coil spring is used as a contact component.

In the wire material for a canted coil spring, the oxygen concentration at the interface between the core wire and the copper plating layer may be 10% or less by mass. In this case, it is possible to more reliably obtain a wide nonlinear region.

In the wire material for a canted coil spring, the copper plating layer may have a thickness of 10 μm or more and 65 μm or less. When the copper plating layer has a thickness of 10 μm or more, sufficient conductivity is easily obtained. When the copper plating layer has a thickness of 65 μm or less, high strength and a high elastic limit are easily obtained. Thereby, a wide nonlinear region is easily obtained.

From the viewpoint of obtaining a wider nonlinear region, the copper plating layer may have a thickness of 50 μm or less.

In the wire material for a canted coil spring, the core wire may have a diameter of 0.05 mm or more and 2.0 mm or less. In this case, it is possible to obtain the wire material for a canted coil spring, the wire material being particularly suitable for the production of the canted coil spring.

A canted coil spring according to the present invention is composed of the wire material for a canted coil spring. Because the canted coil spring according to the present invention is composed of the wire material for a canted coil spring according to the present invention, it is possible to provide the canted coil spring that is composed of an alternative material to beryllium copper and that has a wide nonlinear region and stable conductivity.

Details of Embodiments of Present Invention

Embodiments of a wire material for a canted coil spring and a canted coil spring according to the present invention will be described below with reference to the drawings. In the drawings, the same or equivalent portions are designated using the same reference numerals, and descriptions are not repeated.

Figure 1:
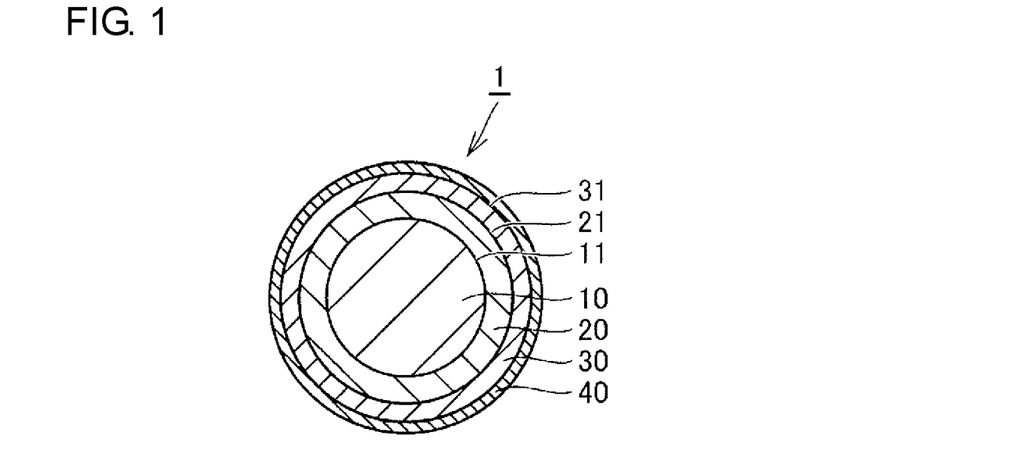
FIG. 1 is a schematic cross-sectional view illustrating a cross section perpendicular to the longitudinal direction of a wire material for a canted coil spring.

As illustrated in FIG. 1, a wire material 1 for a canted coil spring according to this embodiment includes a core wire 10, a copper plating layer 20, a hard layer 30, and a surface layer 40. The core wire 10 is composed of a steel having a pearlite structure. The copper plating layer 20 covers the outer peripheral surface 11 of the core wire 10 and disposed in contact with the outer peripheral surface 11. The copper plating layer 20 is composed of copper or a copper alloy. As the copper alloy, for example, an alloy of copper and at least one metal selected from the group consisting of zinc, tin, phosphorus, and iron can be used.

The hard layer 30 is disposed adjacent to the outer periphery of the copper plating layer 20. The hard layer 30 is disposed in contact with the outer peripheral surface 21 of the copper plating layer 20 so as to cover the outer peripheral surface 21. The hard layer 30 has a higher hardness than the copper plating layer 20.

The surface layer 40 is disposed adjacent to the outer periphery of the hard layer 30. The surface layer 40 is disposed in contact with the outer peripheral surface 31 of the hard layer 30 so as to cover the outer peripheral surface 31. The surface layer 40 is disposed so as to contain the outer peripheral surface of the wire material 1 for a canted coil spring. That is, the surface layer 40 is disposed as the outermost surface of the wire material 1 for a canted coil spring. The surface layer 40 is a gold layer, a silver layer, or a tin layer. The wire material 1 for a canted coil spring has a circular cross section perpendicular to the longitudinal direction of the wire material.

The steel constituting the core wire 10 contains 0.5% or more by mass and 1.0% or less by mass carbon, 0.1% or more by mass and 2.5% or less by mass silicon, and 0.3% or more by mass and 0.9% or less by mass manganese, the balance being iron and unavoidable impurities.

Figure 2:
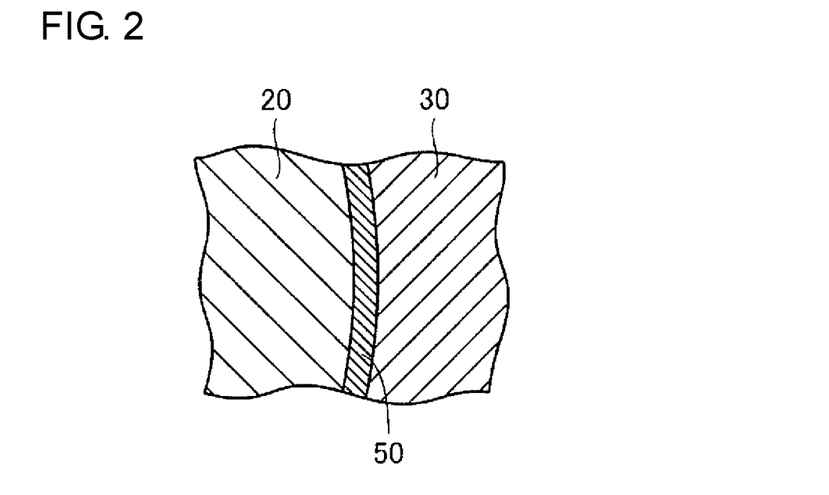
FIG. 2 is a schematic cross-sectional view illustrating the structure of a boundary region between a copper plating layer and a hard layer.

As illustrated in FIG. 2, an alloy region 50 containing a metal element constituting the copper plating layer 20 and a metal element constituting the hard layer 30 is disposed between the copper plating layer 20 and the hard layer 30. The alloy region 50 is disposed at the interface between the copper plating layer 20 and the hard layer 30. That is, the copper plating layer 20 and the hard layer 30 are disposed in contact with each other so as to form an alloy region at the interface therebetween.

Figure 3:
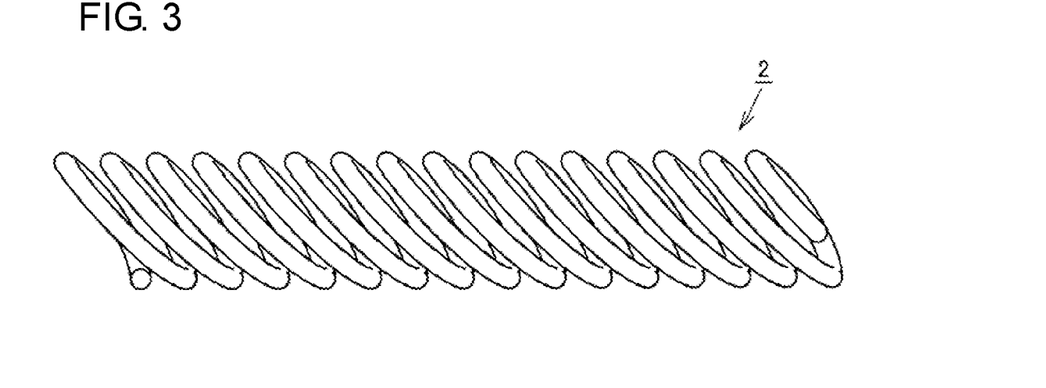
FIG. 3 is a schematic view illustrating the structure of a canted coil spring.

As illustrated in FIG. 3, a canted coil spring 2 according to the embodiment is formed of the wire material 1 for a canted coil spring according to the embodiment. The canted coil spring 2 is a helical spring and has a structure in which the wire material 1 for a canted coil spring is wound at an angle to a plane perpendicular to the axial direction. The canted coil spring 2 is used in such a manner that a load is applied in a direction perpendicular to the axial direction.

Each of the wire material 1 for a canted coil spring and the canted coil spring 2 according to the embodiment includes the high-strength core wire 10 composed of a steel having a pearlite structure and an appropriate component composition. Thereby, a wide nonlinear region can be ensured. The core wire 10 has the outer peripheral surface 11 covered with the copper plating layer 20 composed of copper or a copper alloy having good conductivity. Thereby, high conductivity is ensured.

Each of the wire material 1 for a canted coil spring and the canted coil spring 2 is not a clad wire formed by integrating a core wire with a separately provided member to be an outer layer, but has a structure in which the copper plating layer 20 is disposed on the outer peripheral surface 11 of the core wire 10. This inhibits the occurrence of a phenomenon in which the copper plating layer 20 serving as an outer layer with respect to the core wire 10 is displaced when a load is applied. Thereby, it is possible to ensure a wide nonlinear region.

Each of the wire material 1 for a canted coil spring and the canted coil spring 2 includes the hard layer 30 disposed adjacent to the outer periphery of the copper plating layer 20. The hard layer 30 having a higher hardness than the copper plating layer 20 is disposed adjacent to the outer periphery of the copper plating layer 20, i.e., on the side on which a large stress acts; thus, it is possible to inhibit a decrease in conductivity due to the fatigue failure of the copper plating layer 20. This enables stable conductivity to be achieved.

As described above, the wire material 1 for a canted coil spring and the canted coil spring 2 are a wire material for a canted coil spring and a canted coil spring that are composed of an alternative material to beryllium copper, that have a wide nonlinear region, and that can achieve stable conductivity.

In the wire material 1 for a canted coil spring and the canted coil spring 2 according to the embodiment, the alloy region 50 is disposed between the copper plating layer 20 and the hard layer 30. Although the formation of the alloy region 50 is not essential, the presence of the alloy region 50 strongly bonds the copper plating layer 20 and the hard layer 30 together.

The surface layer 40 is disposed on the hard layer 30 of each of the wire material 1 for a canted coil spring and the canted coil spring 2 so as to contain the outer peripheral surface of each of the wire material 1 for a canted coil spring and the canted coil spring 2. Although the formation of the surface layer 40 is not essential, the presence of the surface layer 40 enables contact resistance to be reduced when the canted coil spring 2 is used as a contact component.

In each of the wire material 1 for a canted coil spring and the canted coil spring 2, the steel constituting the core wire 10 may further contain one or more elements selected from the group consisting of 0.1% or more by mass and 0.4% or less by mass nickel, 0.1% or more by mass and 1.8% or less by mass chromium, 0.1% or more by mass and 0.4% or less by mass molybdenum, and 0.05% or more by mass and 0.3% or less by mass vanadium. Also in the case where the core wire 10 having the component composition is used, the wire material 1 for a canted coil spring and the canted coil spring 2 are composed of an alternative material to beryllium copper, and a wide nonlinear region can be obtained.

In each of the wire material 1 for a canted coil spring and the canted coil spring 2, the steel constituting the core wire 10 may have a silicon content of 1.35% or more by mass and 2.3% or less by mass. A silicon content of 1.35% or more by mass results in the inhibition of softening due to strain relieving heat treatment. A silicon content of 2.3% or less by mass results in the inhibition of a decrease in toughness.

In each of the wire material 1 for a canted coil spring and the canted coil spring 2, the steel constituting the core wire 10 may contain 0.6% or more by mass and 1.0% or less by mass carbon, 0.12% or more by mass and 0.32% or less by mass silicon, and 0.3% or more by mass and 0.9% or less by mass manganese, the balance being iron and unavoidable impurities.

In each of the wire material 1 for a canted coil spring and the canted coil spring 2, the steel constituting the core wire 10 may contain 0.6% or more by mass and 1.0% or less by mass carbon, 0.7% or more by mass and 1.0% or less by mass silicon, and 0.3% or more by mass and 0.9% or less by mass manganese, the balance being iron and unavoidable impurities.

In each of the wire material 1 for a canted coil spring and the canted coil spring 2, the steel constituting the core wire 10 may contain 0.55% or more by mass and 0.7% or less by mass carbon, 1.35% or more by mass and 2.3% or less by mass silicon, 0.3% or more by mass and 0.9% or less by mass manganese, 0.2% or more by mass and 1.8% or less by mass chromium, and 0.05% or more by mass and 0.30% or less by mass vanadium, the balance being iron and unavoidable impurities.

When the steel having such a component composition is used as a steel constituting the core wire 10, a wide nonlinear region can be more reliably obtained.

In each of the wire material 1 for a canted coil spring and the canted coil spring 2, the oxygen concentration at the interface between the core wire 10 and the copper plating layer 20 is preferably 10% or less by mass. In this case, it is possible to more reliably obtain a wide nonlinear region. The oxygen concentration at the interface between the core wire 10 and the copper plating layer 20 can be measured by, for example, performing a quantitative analysis by energy dispersive X-ray spectrometry (EDS) on a square region having a side of 300 μm in a cross section of the wire material 1 for a canted coil spring, the square region including the interface between the core wire 10 and the copper plating layer 20, the cross section being perpendicular to the longitudinal direction.

The hard layer 30 preferably has a hardness of 300 HV or more. In this case, it is possible to more reliably achieve stable conductivity. The hard layer 30 preferably has a hardness of 50 HV or more higher than the copper plating layer 20. In this case, it is possible to more reliably achieve stable conductivity. The hard layer 30 may have a hardness equal to or lower than the core wire 10. The measurement of the hardness (Vickers hardness) can be performed at a load of 50 g for a holding time of 10 s. The hard layer 30 may have a thickness of, for example, 1 μm or more and 50 μm or less.

The ratio of the thickness of the hard layer 30 to the thickness of the copper plating layer 20 is preferably 1/10 or more and less than 1. At a ratio of 1/10 or more, it is possible to more reliably achieve stable conductivity. At a ratio of less than 1, it is possible to avoid a decrease in production efficiency.

The hard layer 30 is preferably a plating layer. In this case, the hard layer 30 can be easily formed.

The hard layer 30 is preferably a nickel layer or a chromium layer. As a material constituting the hard layer 30, nickel or chromium, which has good strength and good conductivity, is preferably used.

The hard layer 30 is particularly preferably a nickel layer. The nickel layer or the chromium layer can be easily formed by plating. That is, the hard layer 30 may be a nickel plating layer or a chromium plating layer.

The wire material 1 for a canted coil spring preferably has a tensile strength of 900 MPa or more and 3,000 MPa or less. At a tensile strength of 900 MPa or more, sufficient settling resistance is easily obtained. At a tensile strength of 3,000 MPa or less, sufficient toughness is easily ensured.

Each of the wire material 1 for a canted coil spring and the canted coil spring 2 preferably has a conductivity of 15% IACS or more and 50% IACS or less. In this case, the canted coil spring 2 is suitable as a contact component.

When the hard layer 30 is a nickel layer, the alloy region 50 preferably contains copper and nickel. When the hard layer 30 is a nickel layer, the alloy region 50 is preferably a Cu—Ni alloy region. In this case, the copper plating layer 20 and the hard layer 30 are strongly bonded together.

In each of the wire material 1 for a canted coil spring and the canted coil spring 2, the copper plating layer 20 preferably has a thickness of 10 μm or more and 65 μm or less. When the copper plating layer 20 has a thickness of 10 μm or more, sufficient conductivity is easily obtained. When the copper plating layer 20 has a thickness of 65 μm or less, high strength and a high elastic limit are easily obtained. Thereby, a wide nonlinear region is easily obtained.

In the wire material 1 for a canted coil spring, the core wire 10 preferably has a diameter of 0.05 mm or more and 2.0 mm or less. In this case, it is possible to obtain the wire material for a canted coil spring, the wire material being particularly suitable for the production of a canted coil spring.

Figure 4:
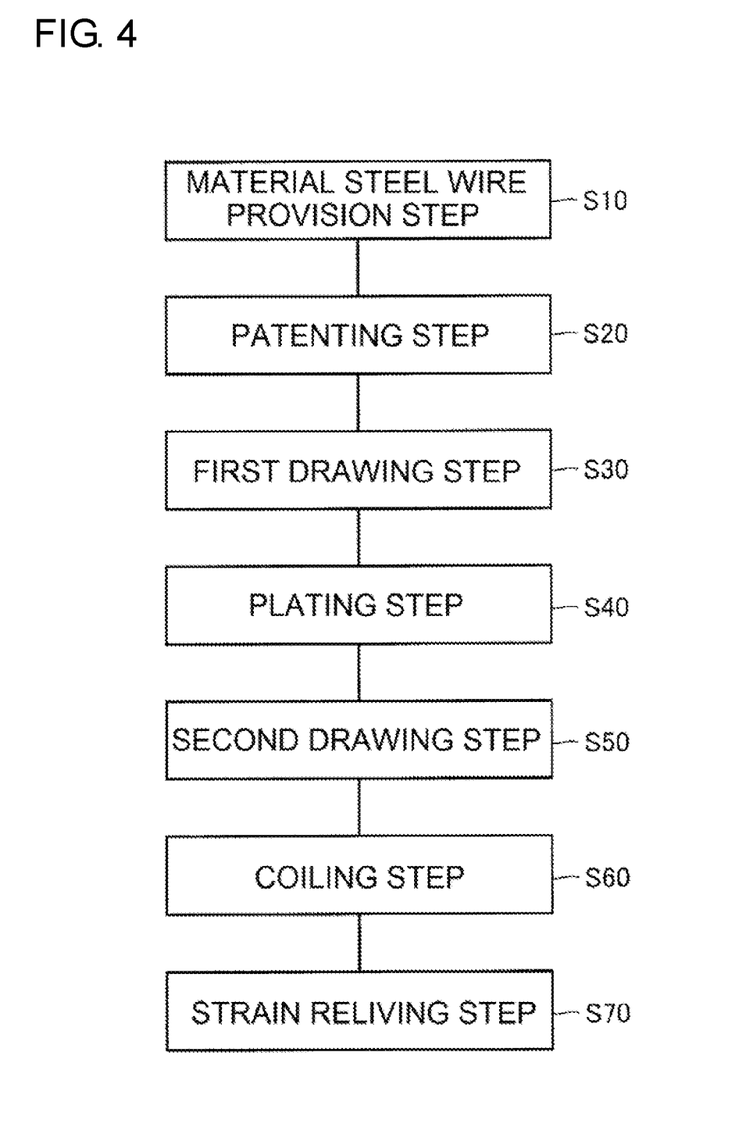
FIG. 4 is a flow chart illustrating a method for producing a wire material for a canted coil spring and a canted coil spring.

An example of a method for producing the wire material 1 for a canted coil spring and the canted coil spring 2 will be described below. As illustrated in FIG. 4, in the method for producing the wire material 1 for a canted coil spring and the canted coil spring 2 according to the embodiment, a material steel wire provision step is first performed as a step (S10). In this step (S10), a steel wire to be the core wire 10 is provided. Specifically, a steel wire is provided which is composed of a steel containing 0.5% or more by mass and 1.0% or less by mass carbon, 0.1% or more by mass and 2.5% or less by mass silicon, and 0.3% or more by mass and 0.9% or less by mass manganese, the balance being iron and unavoidable impurities. The steel constituting the steel wire may further contain one or more element selected from the group consisting of 0.1% or more by mass and 0.4% or less by mass nickel, 0.1% or more by mass and 1.8% or less by mass chromium, 0.1% or more by mass and 0.4% or less by mass molybdenum, and 0.05% or more by mass and 0.3% or less by mass vanadium.

A patenting step is performed as a step (S20). In this step (S20), the material steel wire provided in the step (S10) is subjected to patenting.

Specifically, a heat treatment is performed in which the material steel wire is heated to a temperature region equal to or higher than the austenitizing temperature (Ai point), rapidly cooled to a temperature region higher than the martensitic transformation start temperature ($M_s$ point), and held in the temperature region. Thereby, the metal structure of the material steel wire is formed into a fine pearlite structure having small lamellar spacing. Here, in the patenting treatment, the treatment for heating the material steel wire to the temperature range equal to or higher than the Ai point is performed in an inert gas atmosphere from the viewpoint of inhibiting the occurrence of decarburization.

Figure 5:
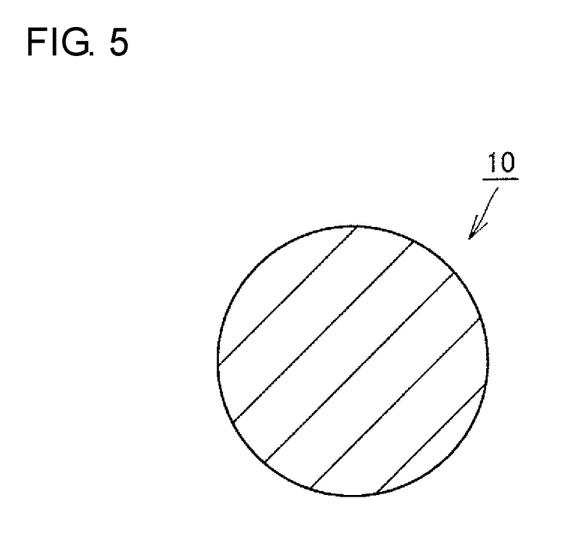
FIG. 5 is a schematic cross-sectional view illustrating a method for producing a wire material for a canted coil spring and a canted coil spring.

Next, a first drawing step is performed as a step (S30). In the step (S30), the material steel wire that has been subjected to patenting in the step (S20) is subjected to wire drawing (drawing processing). This provides the core wire 10 having a pearlite structure and a circular cross section perpendicular to the longitudinal direction, as illustrated in FIG. 5.

Figure 6:
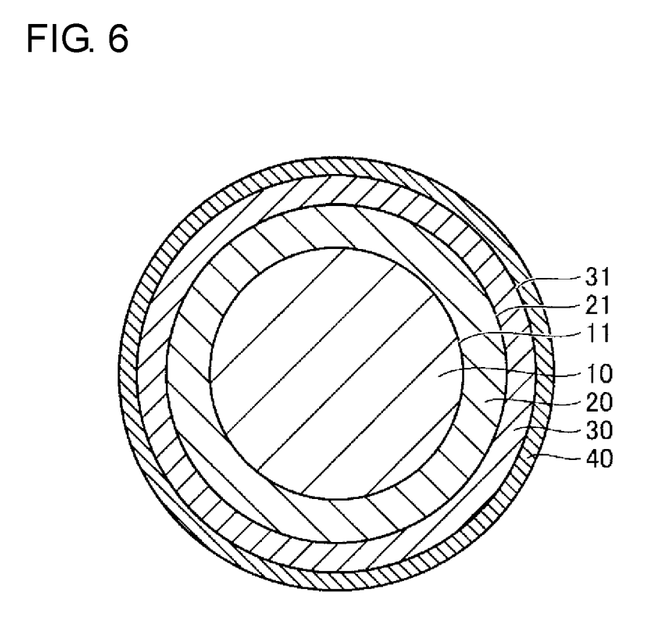
FIG. 6 is a schematic cross-sectional view illustrating the method for producing a wire material for a canted coil spring and a canted coil spring.

A plating step is performed as a step (S40). In the step (S40), as illustrated in FIGS. 5 and 6, multiple plating layers are formed so as to cover the outer peripheral surface 11 of the core wire 10 obtained in the step (S30). First, the copper plating layer 20 composed of copper or a copper alloy is formed. The thickness of the copper plating layer 20 formed in the step (S40) is, for example, 30 μm or more and 90 μm or less. The hard layer 30 is then formed on the copper plating layer 20. Specifically, nickel plating or chromium plating is performed to form a nickel plating layer or a chromium plating layer serving as the hard layer 30. Next, the surface layer 40 is formed on the hard layer 30. Specifically, a gold plating layer, a silver plating layer, a tin plating layer serving as the surface layer 40 is formed on the hard layer 30. Thereby, the copper plating layer 20, the hard layer 30, and the surface layer 40 are formed on the core wire 10 as illustrated in FIG. 6.

A second drawing step is performed as a step (S50). In the step (S50), as illustrated in FIGS. 6 and 1, the core wire 10 on which the copper plating layer 20, the hard layer 30, and the surface layer 40 have been formed in the step (S40) is subjected to drawing processing. Thereby, the wire material 1 for a canted coil spring is obtained, the wire material having a desired wire diameter suitable for the canted coil spring 2. The production of the wire material 1 for a canted coil spring according to the embodiment is completed by the procedure described above. A method for producing the canted coil spring 2 using the wire material 1 for a canted coil spring will be described below.

A coiling step is performed as a step (S60). In the step (S60), as illustrated in FIGS. 1 and 2, the wire material 1 for a canted coil spring obtained in the step (S50) is processed into the shape of the canted coil spring 2. Specifically, the wire material 1 for a canted coil spring is processed into a helical shape and formed into the shape of the canted coil spring 2.

A strain relieving step is performed as a step (S70). In the step (S70), the wire material 1, for a canted coil spring, that has been formed into the canted coil spring 2 in the step (S60) is subjected to heat treatment for heating the wire material 1 to a temperature range of, for example, 250° C. to 400° C. This reduces strain introduced into the wire material 1 for a canted coil spring in the step (S60). It is thus possible to obtain a wide nonlinear region. The production of the canted coil spring 2 according to the embodiment is completed by the procedure described above.

EXAMPLES

A wire material for a canted coil spring according to the present invention was provided. Experiments were conducted to measure the tensile strength and the conductivity and examine the fatigue strength and the stability of the conductivity. The procedures of the experiments are described below.

The steps (S10) to (S50) were performed to produce wire materials for canted coil springs. Each core wire 10 had a diameter of 0.42 mm or 0.32 mm. As a steel constituting the core wire 10, a steel was used which contained 0.63% or more by mass and 0.68% or less by mass carbon, 1.80% or more by mass and 2.20% or less by mass silicon, 0.70% or more by mass and 0.90% or less by mass manganese, 0.50% or more by mass and 0.80% or less by mass chromium, and 0.05% or more by mass and 0.15% or less by mass vanadium, the balance being iron and unavoidable impurities, each of phosphorus and sulfur contained as the impurities being contained in an amount of 0.025% or less by mass. As the copper plating layer 20, a layer composed of a copper alloy was used. As the hard layer 30, a nickel (Ni) layer or a chromium (Cr) layer was used. The formation of the surface layer 40 was omitted (samples A to E). For comparison, similar wire materials in which the hard layer 30 was omitted were provided as wire materials outside the range of the present invention (samples F and G). For comparison, a wire material that had a diameter of 0.42 mm and that was composed of beryllium copper was provided as a wire material outside the range of the present invention (sample H). The tensile strength and the conductivity of each sample were measured. The tensile strength was measured with a SD-500-C tensile tester available from Shimadzu Corporation. The conductivity was measured with a 3522 LCR HiTESTER available from Hioki E.E. Corporation. Table 1 represents details of the samples and test results.

TABLE 1

| | Diameter of core wire (mm) | Thickness of copper plating layer (μm) | Hardness of copper plating layer (HV) | Material of hard layer; thickness (μm) | Hardness of hard layer (HV) | Ratio of hard layer/copper plating layer | Tensile strength (MPa) | Conductivity (% IACS) | Fatigue strength (MPa) | Conductivity after test (% IACS) |
|---|---|---|---|---|---|---|---|---|---|---|
| Sample A | 0.42 | 35 | 70 | Ni; 5 | 350 | 1/7 | 2165 | 28 | 440 | 16 |
| Sample B | 0.42 | 35 | 70 | Ni; 15 | 350 | 3/7 | 2276 | 31 | 500 | 24 |
| Sample C | 0.42 | 35 | 70 | Cr; 15 | 600 | 3/7 | 2395 | 27 | 530 | 21 |
| Sample D | 0.32 | 65 | 70 | Ni; 6.5 | 350 | 1/10 | 1445 | 51 | 440 | 21 |
| Sample E | 0.32 | 65 | 70 | Ni; 20 | 350 | 4/13 | 1502 | 54 | 350 | 42 |

TABLE 1-continued

| | Diameter of core wire (mm) | Thickness of copper plating layer (μm) | Hardness of copper plating layer (HV) | Material of hard layer; thickness (μm) | Hardness of hard layer (HV) | Ratio of hard layer/copper plating layer | Tensile strength (MPa) | Conductivity (% IACS) | Fatigue strength (MPa) | Conductivity after test (% IACS) |
|---|---|---|---|---|---|---|---|---|---|---|
| Sample F | 0.32 | 65 | 70 | — | — | — | 1422 | 50 | 340 | 20 |
| Sample G | 0.42 | 35 | 70 | — | — | — | 2148 | 27 | 400 | 7 |
| Sample H | — | — | — | — | — | — | 1500 | 22 | 400 | — |

As presented in Table 1, the tensile strength and the conductivity of samples A to C and D and E, which are wire materials for canted coil springs according to the present invention, are equal to or higher than those of samples G and F having the same diameter of the core wire and the same thickness of the copper plating layer. Samples A to E, which are wire materials for canted coil springs according to the present invention, have tensile strength and conductivity comparable to or higher than sample H, which is a wire material composed of beryllium copper. The results indicate that in the wire materials for canted coil springs according to the present invention, no clear disadvantage due to the formation of the hard layer is recognized, and the tensile strength and the conductivity comparable to or higher than those of the wire material composed of beryllium copper are ensured.

Experiments were conducted to examine the fatigue strength and the stability of the conductivity of these wire materials. A rotating bending fatigue test was performed with a Hunter fatigue testing machine to examine the relationship between the applied stress and the number of stress cycles to breakage. The stress at which breakage did not occur after 10' cycles of applied stress was defined as the fatigue strength. Additionally, a rotating bending fatigue test was performed with the Hunter fatigue testing machine at an applied stress of 300 MPa to examine the conductivity after predetermined cycles of applied stress. The stability of the conductivity was evaluated by the conductivity after $10^7$ cycles of applied stress. When the conductivity after $10^7$ cycles of applied stress (conductivity after the test) is 15% IACS or more, it can be evaluated that the stability of the conductivity is sufficient for practical use.

Figure 7:
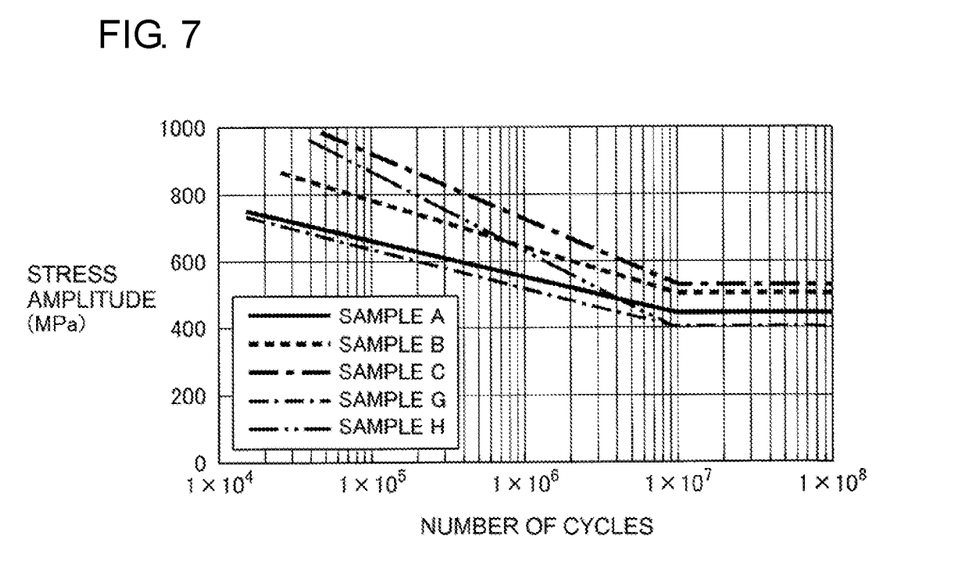
FIG. 7 illustrates the results of a rotating bending fatigue test.
Figure 8:
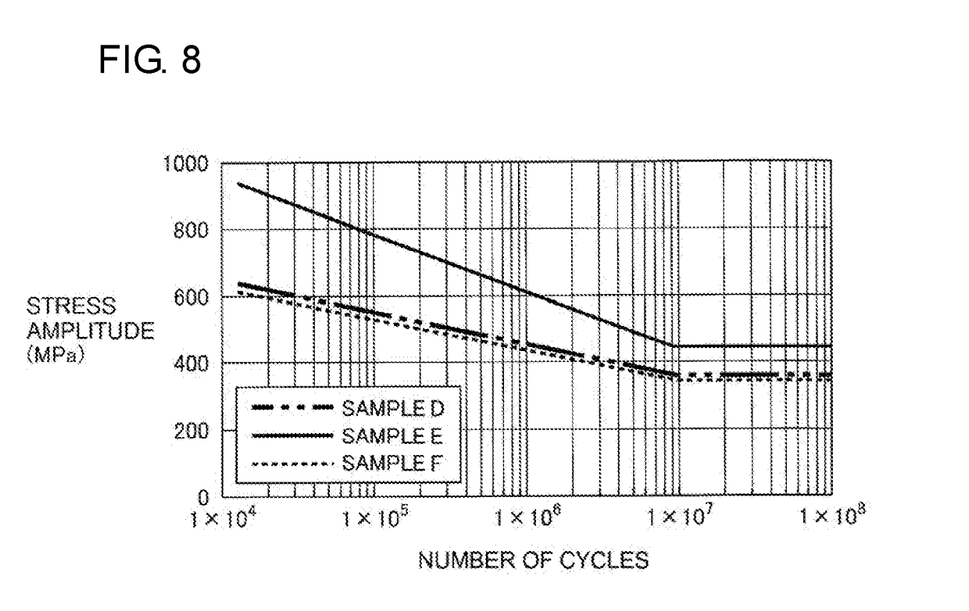
FIG. 8 illustrates the results of a rotating bending fatigue test.

FIGS. 7 and 8 illustrate the results of the fatigue strength test. In each of FIGS. 7 and 8, the horizontal axis represents the number of stress cycles, and the vertical axis represents the stress amplitude. FIG. 7 illustrates the experimental results when the core wire 10 has a diameter of 0.42 mm. FIG. 8 illustrates the experimental results when the core wire 10 has a diameter of 0.32 mm.

FIGS. 7 and 8 and Table 1 indicate that in any of the cases of the core wires 10 having diameters of 0.42 mm and 0.32 mm, samples A to E, which are the wire materials for canted coil springs according to the present invention, have fatigue strength equal to or higher than the wire materials F and G, which have fatigue strength outside the range of the present invention. Additionally, samples A to C, which are wire materials for canted coil springs according to the present invention, have fatigue strength equal to or higher than sample H, which is a wire material composed of beryllium copper.

Figure 9:
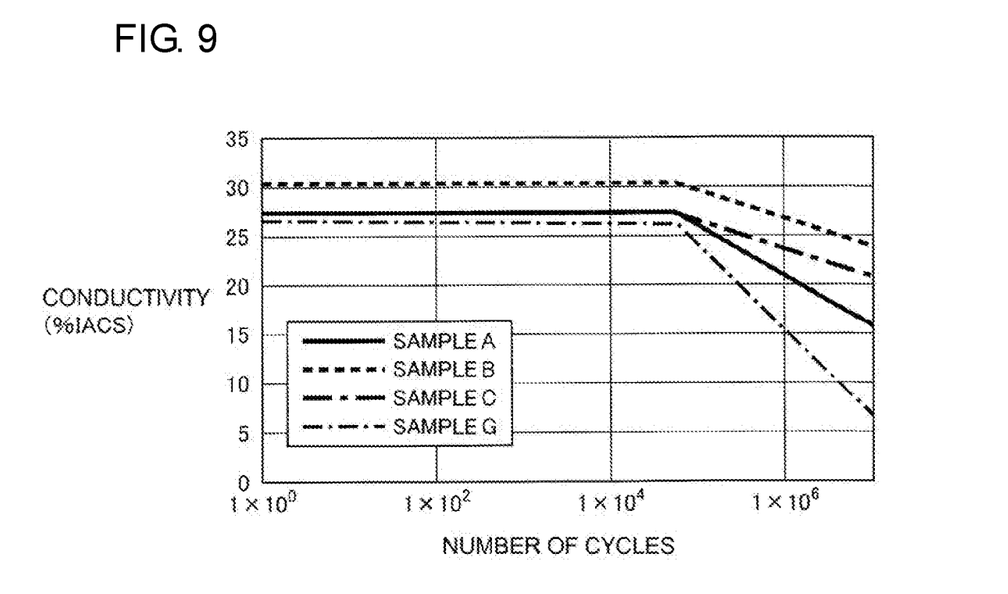
FIG. 9 illustrates the relationship between the number of stress cycles and the conductivity.
Figure 10:
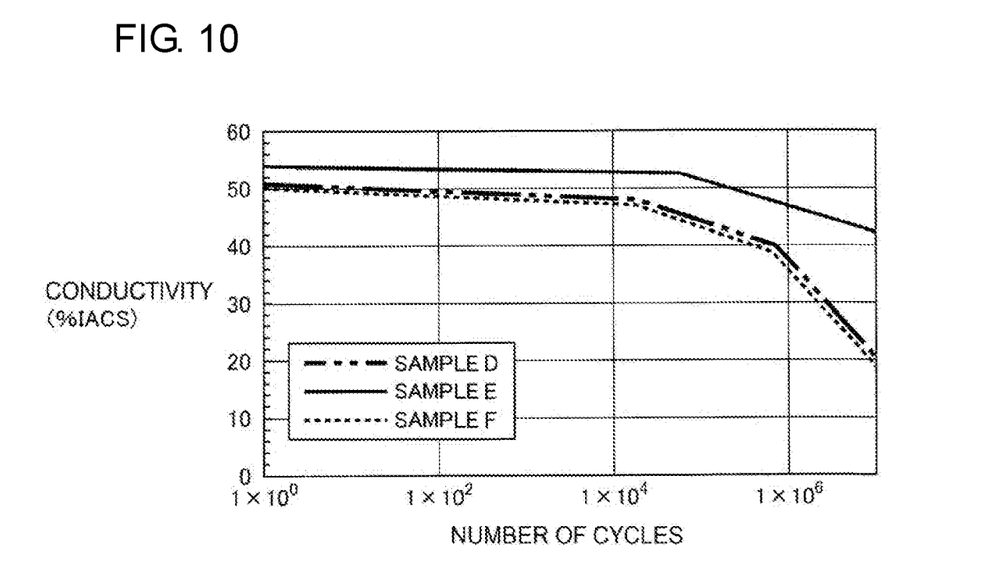
FIG. 10 illustrates the relationship between the number of stress cycles and the conductivity.

FIGS. 9 and 10 illustrate the results of the experiments to examine the stability of the conductivity. In each of FIGS. 9 and 10, the horizontal axis represents the number of stress cycles, and the vertical axis represents the conductivity. FIG. 9 illustrates the experimental results when the core wire 10 has a diameter of 0.42 mm. FIG. 10 illustrates the experimental results when the core wire 10 has a diameter of 0.32 mm.

FIGS. 9 and 10 and Table 1 indicate that in any of the cases of the core wires 10 having diameters of 0.42 mm and 0.32 mm, samples A to E, which are the wire materials for canted coil springs according to the present invention, maintain conductivity values equal to or higher than those of wire materials F and G, which have conductivities outside the range of the present invention. Additionally, samples A to E, which are the wire materials for canted coil springs according to the present invention, have conductivities of 15% IACS or more even after $10^7$ cycles of applied stress. Therefore, it can be evaluated that the samples have the stability of the conductivity sufficient for practical use.

The foregoing experimental results indicate that in the wire material for a canted coil spring according to the present invention, sufficient strength and stable conductivity can be achieved.

APPENDIX

In the wire material for a canted coil spring according to the present invention, as described above, it is possible to provide a wire material for a canted coil spring, the wire material being composed of an alternative material to beryllium copper, having a wide nonlinear region, and being capable of achieving stable conductivity. This wire material cannot necessarily be used only for canted coil springs, but can be used for springs in general. According to the wire material including the high-strength core wire composed of the steel having a pearlite structure and the appropriate component composition, the copper plating layer, and the hard layer, it is possible to produce a spring capable of maintaining a high repulsive force while ensuring stable conductivity. Thus, the wire material is suitable as a wire material for a spring, the wire material being used for the production of a spring (helical spring) such as a spring for a switch (conductive spring). Additionally, a spring formed of the wire material is suitable as a spring (helical spring) such as a spring for a switch (conductive spring).

The embodiments and the examples disclosed herein are to be considered in all respects as illustrative and not limiting. The scope of the invention is defined not by the foregoing description but by the following claims, and is intended to include any modifications within the scope and meaning equivalent to the scope of the claims.

REFERENCE SIGNS LIST 1 wire material for canted coil spring
2 canted coil spring
10 core wire
11 outer peripheral surface
20 copper plating layer
21 outer peripheral surface 30 hard layer
31 outer peripheral surface
40 surface layer
50 alloy region

The invention claimed is:

1. A wire material for a canted coil spring, the wire material comprising:
   a core wire composed of a steel having a pearlite structure;
   a copper plating layer covering an outer peripheral surface of the core wire, the copper plating layer being composed of copper or a copper alloy; and
   a hard layer disposed adjacent to an outer periphery of the copper plating layer, the hard layer having a higher hardness than the copper plating layer,
   the steel containing 0.5% or more by mass and 1.0% or less by mass carbon, 0.8% or more by mass and 2.5% or less by mass silicon, and 0.3% or more by mass and 0.9% or less by mass manganese, the balance being iron and unavoidable impurities,
   wherein the steel further contains more than 0.5% by mass and 1.8% or less by mass chromium,
   wherein the wire material has a tensile strength of 900 MPa or more and 3,000 MPa or less, and
   wherein an oxygen concentration at an interface between the core wire and the copper plating layer is 10% or less by mass.

2. The wire material for a canted coil spring according to claim 1, wherein a ratio of a thickness of the hard layer to a thickness of the copper plating layer is 1/10 or more and less than 1.

3. The wire material for a canted coil spring according to claim 1, wherein the hard layer is a plating layer.

4. The wire material for a canted coil spring according to claim 1, wherein the hard layer is a nickel layer or a chromium layer and directly covers the copper plating layer.

5. The wire material for a canted coil spring according to claim 1, wherein the wire material has a conductivity of 15% IACS or more and 50% IACS or less.

6. The wire material for a canted coil spring according to claim 1, wherein an alloy region containing a metal element constituting the copper plating layer and a metal element constituting the hard layer is disposed between the copper plating layer and the hard layer.

7. The wire material for a canted coil spring according to claim 6, wherein the hard layer is a nickel layer, and
   the alloy region contains copper and nickel.

8. The wire material for a canted coil spring according to claim 1, wherein a gold layer, a silver layer, or a tin layer is disposed on the hard layer so as to constitute an outer peripheral surface of the wire material for a canted coil spring.

9. A canted coil spring, comprising the wire material for a canted coil spring according to claim 1.

10. The wire material for a canted coil spring according to claim 1, wherein the steel contains 1.8% or more by mass and 2.5% or less by mass silicon.

* * * * *